Patented May 6, 1952

2,595,605

UNITED STATES PATENT OFFICE 2,595,605

METHOD OF PRODUCING POLYMYXIN

Milton A. Petty, Pearl River, N. Y., assignor to American Cyanamid Company, New York, N. Y., a corporation of Maine No Drawing. Application August 7, 1948, Serial No. 43,159

6 Claims. (Cl. 195—42)

This invention relates to a new and improved method of producing polymyxin.

The antibiotic polymyxin has recently become of increasing importance in the treatment of a number of diseases, particularly those caused by Gram negative bacteria.

In the Johns Hopkins Hospital Bulletin of July 1947, Stansly et al. describes the preparation of polymyxin by the aerobic fermentation of a medium consisting of glucose, ammonium sulfate, yeast extract, potassium dihydrogen phosphate, magnesium sulfate heptahydrate, ferrous sulfate heptahydrate and sodium chloride with Bacillus polymyxa. According to the authors of this article, deep fermentation ordinarily yields liquor having a potency of about 200 units per ml., while the yield from shallow layer production is somewhat less. The above method gives good results, however, it is highly desirable that a fermentation medium be developed which would produce a higher potency.

I have found that striking increases in polymyxin production on initial fermentation are obtained when corn meal is added to the fermentation medium in addition to or to replace wholly or in part the glucose. Increased yields up to six fold have been obtained through the use of corn meal as an ingredient of the fermentation medium.

I prefer to carry out the process of the present invention in deep fermentation tanks, although it can be carried out on a shallow layer production basis if desired. The preferred medium contains the usual inorganic salts referred to above as well as yeast extract, dextrose and from about ½% to about 10% corn meal. The fermentation medium is sterilized for about 30 minutes at 110° C. After sterilization the pH is usually within the range 6.8 to 7.2. Either at the beginning of the fermentation or during the course of fermentation it is desirable to add an oil such as mineral oil, lard oil and the like as antifoaming agents. The inoculum prepared from a culture of Bacillus polymyxa is then added to the fermentation medium. The medium is maintained at a temperature of from 23° C. to 32° C. for a period of from 40 to 120 hours. When large scale equipment is used the individual conditions as determined in 100 gallon tank fermenters may well be found to require modification. Aeration with sterile air at the rate of about .05 to 2.0, preferably about 0.3 volume of air per volume of mash per minute, has been found suitable.

I prefer to prepare the inoculum for inoculating the fermentation medium as follows: A culture of Bacillus polymyxa in a tube with Trypticase Soy Bean broth is incubated overnight at 25° C. A 5 ml. portion of this culture is transferred to 100 ml. of fermentation medium in a 500 ml. Erlenmeyer flask which is incubated for 48 hours at room temperature. This 100 ml. culture serves as inoculum for one 100 gallon tank fermentation. For larger units of fermentation medium proportionately larger amounts of inoculum is used.

When dextrose or glucose alone is used as a source of carbohydrate it was found that agitation of the fermentation medium did not produce increased yields. In the process of the present invention wherein corn meal is added to the fermentation medium, higher yields of polymyxin have been obtained, maximum yields being obtained when the medium is agitated during the course of fermentation. This agitation can be accomplished by the use of a stirrer. When agitation is used in the course of fermentation, it is desirable that the fermentation approximate the minimum fermentation period since potencies tend to decline when fermentations are carried beyond.

As the fermentation is taking place, it is desirable at intervals of approximately 8 hours to take samples and determine the pH and to Gram stain the samples in order to check the course of the fermentation and the presence of contaminants. Should the pH fall to 5 or below, it is generally an indication that the desired fermentation is not taking place and the fermentation medium will have an acrid odor with very little polymyxin produced.

After fermentation is complete, a sample of the fermentation liquor is assayed with Escherichia coli or Brucella bronchiseptica. After assaying the amount of polymyxin present, the product can be separated from the fermentation medium and purified by a number of methods described and claimed in co-pending application, Serial Number 744,940, filed April 30, 1947.

A unit of polymyxin is defined as the activity of that amount of polymyxin in one ml. of nutrient agar which just prevents the growth of the test organism.

The following examples will illustrate the invention in greater particularity.

*Example 1*

In a pilot plant tank 225 liters of a medium containing the following ingredients was prepared: 2% ammonium sulfate, 0.2% potassium dihydrogen phosphate, 0.05% magnesium sulfate heptahydrate, 0.005% sodium chloride, 0.001% ferrous sulfate heptahydrate, 0.5% yeast extract, 1% dextrose, 1% calcium carbonate and 3% corn meal. The fermentation medium was adjusted to pH 7.3 to 7.4. It was then sterilized for 30 minutes at 110° C. After sterilization the pH was about 7. To the medium was added 225 ml. of mineral oil. The fermentation medium was inoculated with Bacillus polymyxa prepared as follows: A culture of Bacillus polymyxa in a tube with Trypticase Soy Bean broth was incubated overnight at 25° C., 5 ml. of this culture was transferred to 100 ml. of the tank medium in a 500 ml. Erlenmeyer flask which was incubated for 48 hours at room temperature. This 100 ml. culture served as inoculum for one tank. During the course of fermentation the medium was aerated at the rate of 0.3 volume of air per volume of mash per minute. The temperature was maintained at about 27° C. Samples of mash were taken every 8 hours in order to determine pH and the presence of contaminants and spores. After 88 hours of fermentation the pH was about 6.3 and an assay using Escherichia coli showed the presence of 1200 units of polymyxin per cubic centimeter.

The polymyxin was extracted and purified by removing the mycelia, adsorbing the active principle on charcoal and eluting with acidic methanol.

*Example 2*

An experiment was carried out following the procedure of Example 1 with the exception that the fermentation lasted 120 hours and the fermentation medium was agitated with a stirrer making 150 R. P. M. A product when assayed with Escherichia coli shows 1215 units of polymyxin.

*Example 3*

In another experiment following the general procedure of Example 1, with the exception that the yeast extract was replaced with Anheuser Busch strain G yeast, ½% additional corn meal was added and 170 ml. of lard oil was used in place of mineral oil. The fermentation medium was agitated at the rate of 150 R. P. M. and the fermentation allowed to proceed for 137 hours. The fermentation medium when assayed against Escherichia coli showed the presence of 560 units per ml. of polymyxin.

*Example 4*

In another experiment similar to Example 1 in which 50 ml. of lard oil was used in place of mineral oil and the mixture agitated 5 minutes per hour at the rate of 150 R. P. M. for 88 hours. At the end of the fermentation period the pH of the medium was 6.6 and when assayed against Escherichia coli showed the presence of 520 units per ml. of polymyxin.

*Example 5*

An experiment was carried out in a 225 liter pilot plant tank similar to Example 1 in which 3% glucose was added and the mixture agitated at 150 R. P. M. for 80 hours. At the end of the fermentation period assay of the medium showed the presence of 1800 units per ml. of polymyxin.

*Example 6*

An experiment was carried out on a small scale using the basic medium of Example 1 in which 100 ml. per flask was used. The medium was agitated by a shaker having a speed of 95 strokes per minute. The fermentation medium, after completion of fermentation, showed the presence of 1130 units per ml. of polymyxin.

*Example 7*

An experiment similar to Example 6 was carried out in which an additional 2% dextrose was added to the medium. An assay of the fermentation medium showed the presence of 1100 units per ml. of polymyxin.

*Example 8*

An experiment similar to Example 7 was carried out in which the fermentation medium when assayed against Escherichia coli showed the presence of 1000 units per ml. of polymyxin.

*Example 9*

An experiment was carried out using the fermentation medium of Example 1, but without any corn meal present. After allowing fermentation to proceed for 88 hours the medium had a pH of 6.3. Assay with Escherichia coli showed the presence of 210 units per ml. of polymyxin.

This example shows that low yields are obtained when the regular medium is used without the presence of corn meal.

I claim:

1. An improved method of producing polymyxin which comprises inoculating with Bacillus polymyxa a liquid nutrient medium essentially including ammonium sulfate 2%, potassium dihydrogen phosphate 0.2%, magnesium sulfate heptahydrate 0.05%, sodium chloride 0.005%, ferrous sulfate heptahydrate 0.001%, yeast extract 0.5%, dextrose 1%, calcium carbonate 1% and corn meal about 3%, and aerating the medium during the fermentation process until polymyxin is produced.

2. An improved method of producing polymyxin which comprises inoculating with Bacillus polymyxa a liquid nutrient medium essentially including ammonium sulfate 2%, potassium dihydrogen phosphate 0.2%, magnesium sulfate heptahydrate 0.05%, sodium chloride, 0.005%, ferrous sulfate heptahydrate 0.001%, yeast extract 0.5%, dextrose 1%, calcium carbonate 1% and corn meal about 3%, aerating the medium during fermentation at the rate of about .05 to 2.0 volumes of air per volume of mash per minute and agitating said medium until polymyxin is produced.

3. An improved process for the production of polymyxin which comprises subjecting an aqueous medium containing a carbohydrate, yeast extract, an inorganic source of nitrogen, nutrient inorganic salts and from ½% to about 10% corn meal to the action of Bacillus polymyxa under aerobic conditions while agitating said medium until polymyxin is produced.

4. An improved process for the production of polymyxin which comprises growing under aerobic conditions a culture of Bacillus polymyxa in a substantially aqueous medium containing a proteinaceous substance of the group consisting of yeast extract and brewers yeast, a carbohydrate of the group consisting of dextrose and glucose, an inorganic source of nitrogen, nutrient inorganic salts and from ½% to about 10% corn meal, at a temperature within the range of 23° C. to about 32° C. for a period of time of about 40 hours to about 120 hours.

5. An improved process for the production of polymyxin which comprises growing under aerobic conditions a culture of *Bacillus polymyxa* in a substantially aqueous medium containing yeast extract, dextrose, an inorganic source of nitrogen, nutrient inorganic salts and from ½% to about 10% corn meal, at a temperature within the range of 23° C. to about 32° C. for a period of from about 40 hours to about 120 hours.

6. An improved process for the production of polymyxin which comprises growing under aerobic conditions a culture of *Bacillus polymyxa* in a substantially aqueous medium containing yeast extract, dextrose, ammonium sulfate, nutrient inorganic salts and from ½% to about 10% corn meal, at a temperature within the range of 23° C. to about 32° C. for a period of from about 40 hours to about 120 hours.

MILTON A. PETTY.

REFERENCES CITED

The following references are of record in the file of this patent:

UNITED STATES PATENTS

| Number | Name | Date |
|---|---|---|
| 1,899,156 | Kluyver et al. | Feb. 28, 1933 |

FOREIGN PATENTS

| Number | Country | Date |
|---|---|---|
| 315,263 | Great Britain | 1930 |

OTHER REFERENCES

Tilden et al., *B. macerans* and *B. polymyxa* Amylases, Jour. Bact. 43, (1942), pages 527 to 544 (page 533 relied upon).

Stansly et al., Johns Hopkins Hospital Bulletin 81, July 1947, pp. 43 to 54.

Stansly et al., Jour. Bact. 55, 4, April 1948, pp. 573 to 578.